United States Patent
Ziegler et al.

(10) Patent No.: US 6,170,718 B1
(45) Date of Patent: Jan. 9, 2001

(54) VOLUMETRIC BATCH DOSING DEVICE

(75) Inventors: Axel Ziegler, Heyerstrasse 61, D-40625 Düsseldorf; Andreas Gründer, Schwalmatal, both of (DE)

(73) Assignee: Axel Ziegler, Dusseldorf (DE)

( * ) Notice: Under 35 U.S.C. 154(b), the term of this patent shall be extended for 0 days.

(21) Appl. No.: 09/331,835

(22) PCT Filed: Dec. 24, 1997

(86) PCT No.: PCT/EP97/07305

§ 371 Date: Jun. 24, 1999

§ 102(e) Date: Jun. 24, 1999

(87) PCT Pub. No.: WO98/29713

PCT Pub. Date: Jul. 9, 1998

(30) Foreign Application Priority Data

Jan. 3, 1997 (DE) ............................................. 197 00 093

(51) Int. Cl.$^7$ ..................................................... G01F 11/28
(52) U.S. Cl. ..................... 222/450; 222/64; 222/189.09; 222/634; 222/464.5; 366/107; 141/70; 141/94; 141/198

(58) Field of Search .................................. 222/53, 56, 64, 222/95, 96, 189.09, 632, 634, 636, 464.1, 464.5, 450; 366/107; 141/65, 67, 70, 94, 95, 114, 192, 198

(56) References Cited

U.S. PATENT DOCUMENTS

| 3,858,733 | * | 1/1975 | Morioka et al. | 141/94 |
| 4,172,539 | * | 10/1979 | Botkin | 222/195 |
| 4,378,897 | * | 4/1983 | Kattleman | 222/56 |
| 5,738,153 | * | 4/1998 | Gerling et al. | 141/83 |

* cited by examiner

Primary Examiner—Henry J. Recla
Assistant Examiner—Timothy L. Maust
(74) Attorney, Agent, or Firm—Herbert Dubno

(57) ABSTRACT

A volumetric dosing system for bulk material utilizes a telescoping measuring container in which the upper portion carries the upper limit sensor for the height of the bulk material in the container and extends into the lower container below the level of the bulk material therein. Upper and lower closures are controlled by this sensor and another sensor detecting the system. The unit is disposed between a mixer and a silo.

10 Claims, 2 Drawing Sheets

VOLUMETRIC BATCH DOSING DEVICE

CROSS REFERENCE TO RELATED APPLICATIONS

This application is a national stage of PCT/EP97/07305 filed Dec. 24, 1997 and based upon German national application 197 00 093.2 filed Jan. 3, 1997 under the International Convention.

FIELD OF THE INVENTION

The subject of the present invention is a device for the batchwise volumetric dosing or metering of lightweight pourable material, especially expanded perlite, comprised of a measurement container with an upper material inlet from a supply or storage silo, a closable lower material outlet communicating with a mixer and a measurement probe which, when the material reaches the desired filling height, closes the upper material inlet.

BACKGROUND OF THE INVENTION

Expanded perlite is increasingly being added in different proportions to various materials, for example for building products and building materials like plasterboard and gypsum/cardboard boards. Since the expanded perlite in general has a bulk density of only 40–80 g/l and serves primarily to make the end product lighter, it usually is metered not by weight but rather by volume. This dosing or metering has been carried out heretofore with the aid of a measuring container into which the material is filled from a storage silo, for example via a conveyor worm. The measurement container has a measurement probe which interrupts the material feed when the desired filling height is reached. This measurement probe is height adjustable so that any desired volume per charge can be established. The measurement container also has a material outlet at its lower end through which the material can be poured into or caused to flow into the mixer.

This type of batchwise volumetric dosing of expanded perlite is relatively inexact and can give rise to the escape of dust which can be removed only by the expensive application of suction.

OBJECT OF THE INVENTION

It is the object of the invention to provide for a more exact batchwise volumetric dosing of lightweight pourable material, especially expanded perlite, in a simple manner which avoids the escape of dust. Preferably all of the operating stages of the device should be controllable.

SUMMARY OF THE INVENTION

This object can be attained with a device in which the measurement container is comprised of two telescopingly interfitted parts which can be displaced relative to one another and which allow for reproducible height adjustment, wherein below or above the maximum filling height an upper closure device is provided and wherein the lower part of the measurement container is flexibly connected with the mixer.

Preferably the measurement container has at its middle region, a greater diameter than at its upper and lower ends. This provides above all a less bulky and more compact construction of the device so that volumes between 500 and 5000 liters, preferably between 1000 and 3000 liters, can be measured out at relatively short time intervals in a reliable, convenient and reproducible manner and then fed to the mixer.

Furthermore, the measurement container preferably has a venting device above the maximum filling height. This venting unit is advantageously equipped with a dust filter so that the air which is driven out upon filling of the measurement container can be discharged without problems and without blowing the dust which can result into the factory or the environment.

Advantageously, the device according to the invention is provided closely above the material outlet with a second measurement probe. This can signal the point in time at which the material has been completely discharged into the mixer so that the lower closure device can be closed again. Only then can the next cycle of filling and measurement begin. In case the material may not flow quickly or completely from the measurement container into the mixer the measurement container has closely above the lower closure device, one or more nozzles whereby air can be blown in. This loosens the material so that it can flow without problems into the mixer. These nozzles can also be connected with the computer and control unit so that they are only turned on when the lower measurement probe indicates an unexpectedly long period of time in which material remains in the measurement container.

The upper measurement probe which indicates the desired filling height can be located in a preferably constricted or narrowing part of the measurement container so that it can provide a precise indication. In the case in which a very exact metering is to be carried out the upper measurement probe can also be provided above the upper closure unit. This closure unit must then be formed as a slider which can be slid through the layer of material which has already been filled into the measurement container. Instead of sliders, especially flaps and rotary flaps can be used as closure devices which can be used over long periods in a problem-free manner and easily are controlled by measurement signals of the probe.

Since the measurement container is constituted of two telescopingly interfitted parts which are displaced relative to one another and which can be adjusted vertically in a reproducible manner, the desired volume can be set in a very simple manner. The height adjustability is possible for example via toothed racks. This construction can be very robust and can operate in a trouble free manner. It allows the desired filling height to be reproducibly set in a simple way. The desired volumetric amount can be simply determined by calibration curves and can be programmed into the computer and control unit.

In order to compensate the height differences of the lower part of the measuring container at different volumetric amounts, this part of the measurement container is flexibly connected to the mixer. For this purpose either sleeves of corresponding size or flexible rubber hoses are suitable. In principle it is also possible instead of connecting the lower part of the measuring container, to connect the upper part of the measuring container to move up and down, flexibly with the storage silo and the conveyor warm. This, however, requires that not only the upper measurement probe but also the venting duct to be movable up and down. In practice, therefore, the upper part is fixedly mounted and the lower part is configured to be height adjustable so that this part is flexibly connected with the mixer.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
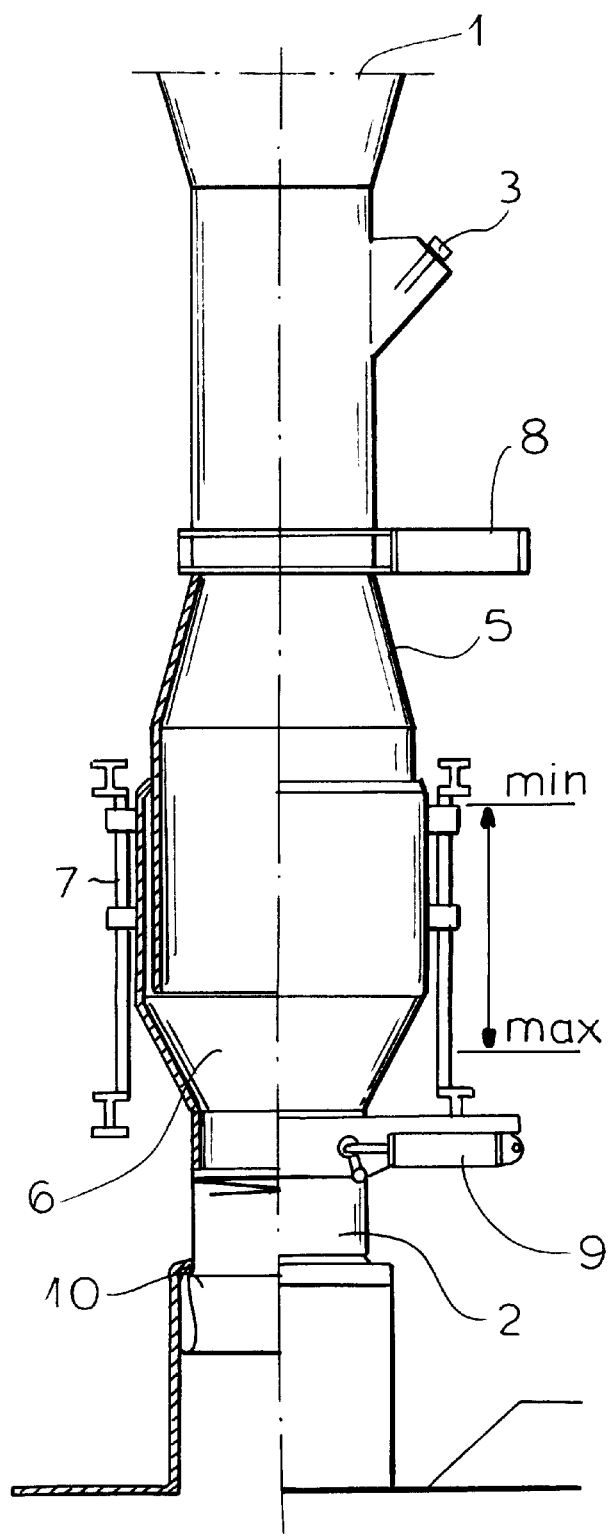
FIG. 1 is a diagrammatic partial cross sectional view through a first embodiment of the apparatus of the invention.
Figure 2:
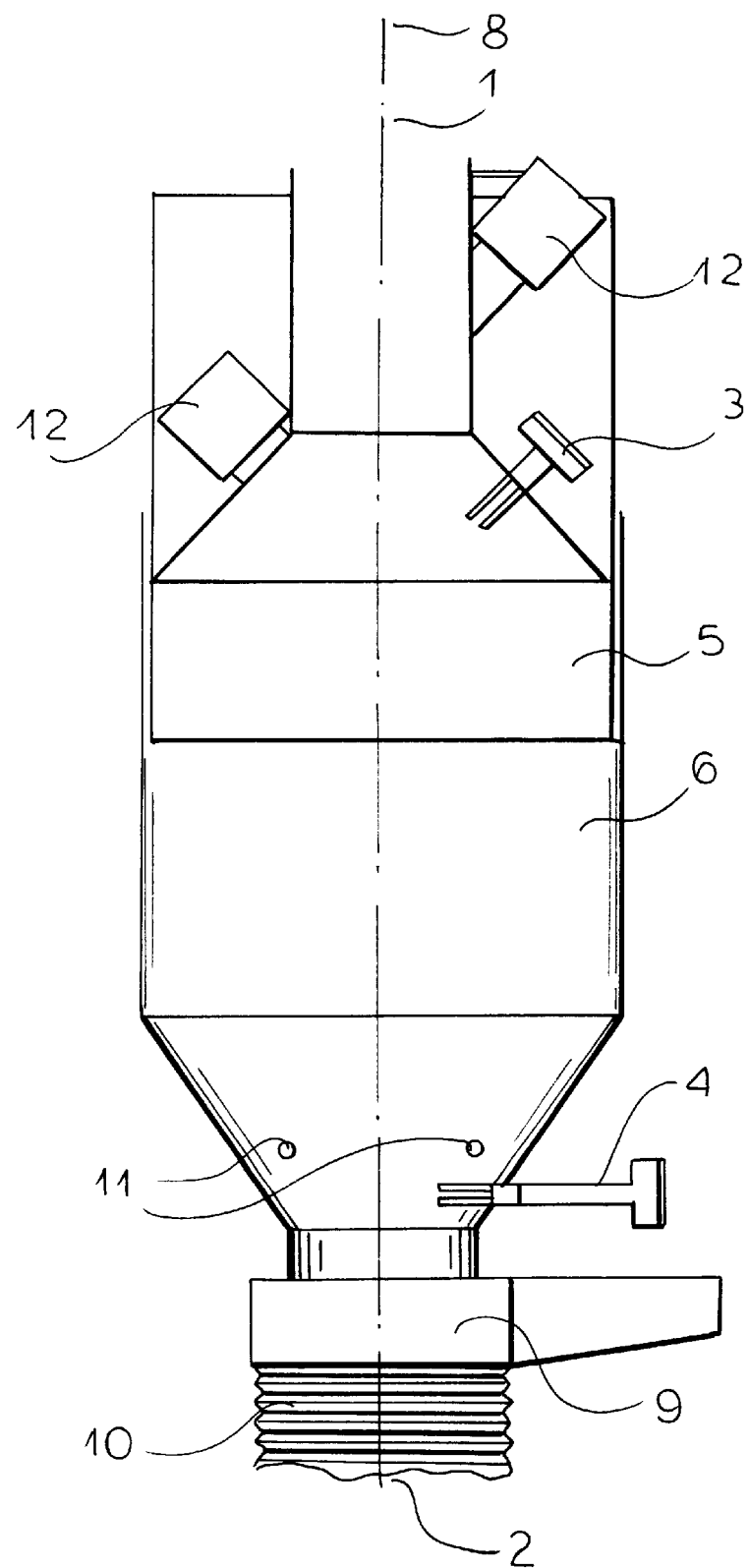
FIG. 2 is a diagrammatic section of a second embodiment of the apparatus.

FIGS. 1 and 2 show two different embodiments of the invention in which the same reference numerals are used to indicate portions of the apparatus which are equivalent in the two embodiments.

As can be seen from FIG. 1, the apparatus of the invention has an upper material inlet 1 which can be connected to a storage silo and a lower material outlet 2 which can be connected to a mixer.

Between this inlet and outlet, there is a measurement container which can be telescopingly adjusted as to height and which has an upper part 5 and a lower part 6. The two parts interfit so that height adjustment can be effected by a device 7 which can be a two-rack between the upper part 5 of the measurement container and the upper material inlet 1, a measurement probe 3 can be provided for detecting the desired filling height and between the lower member 6 of the measurement container and the lower material outlet, a measurement probe 4 (FIG. 2) can be provided for indicating the emptying.

In FIG. 1, an upper closure device 8, which can be rotary flaps or a slider, is provided between the upper material inlet and the upper part 5 of the measurement container. The upper closure device 8 has not been shown in FIG. 2 but the reference numeral has been provided to indicate that it normally would be present.

A lower closure device 9 is provided between the lower part 6 of the measurement container and the lower material outlet 2. The lower closure device 9 has been indicated only schematically in FIG. 2.

A flexible connection 10 is provided between the mixer and the lower material outlet 2 and, as can be seen from FIG. 2, nozzles 11 can be provided for blowing in air to facilitate the outflow of the material.

A venting device 12 with a dust filter is provided above a maximum filling height of the container (FIG. 2).

What is claimed is:

1. An apparatus for batchwise volumetric dosing of lightweight pourable material, comprising:

a measuring container with an upper material inlet adapted to be connected with a storage silo located above the measuring container and a closable lower material outlet adapted to be connected to a mixer located below said measuring container;

a measurement probe in said container which, upon reaching the desired filling height of the material, closes the upper material inlet, the measurement container being comprised of two parts shiftable one in the other telescopically relative to one another and which are configured for reproducible height adjustment including an upper part and a lower part, said probe being on said upper part, said upper part reaching downwardly into said lower part below said desired filling height;

an upper closure device in said upper material inlet; and means forming a flexible connection between the lower part of the measurement container and the mixer.

2. An apparatus according to claim 1 wherein the measurement container has a greater diameter at a central region than at upper and lower ends of the measurement container.

3. An apparatus according to claim 1 wherein the measurement container has a venting device above a maximum filling height of the container.

4. An apparatus according to claim 1 wherein closely above the material outlet, a second measurement probe is provided.

5. An apparatus according to claim 1 wherein the closure device is controllable by probe signals.

6. An apparatus according to claim 1 wherein the closure device and the height adjustment are connected with a computer and control unit.

7. An apparatus according to claim 1 wherein above the material outlet at least one nozzle for blowing air in is provided.

8. An apparatus according to claim 1 wherein the closure device is configured as rotary flaps.

9. An apparatus according to claim 3 wherein the venting device is equipped with a dust filter.

10. An apparatus according to claim 1 wherein the closure device is configured as a slider.

* * * * *